(12) United States Patent
Ron et al.

(10) Patent No.: US 11,956,257 B2
(45) Date of Patent: Apr. 9, 2024

(54) DOMAIN MALWARE FAMILY CLASSIFICATION

(71) Applicant: International Business Machines Corporation, Armonk, NY (US)

(72) Inventors: Aviv Ron, Klachim (IL); Alon Freund, Maale Adumim (IL); Avishay Bartik, Be'er Sheva (IL); David Lazar, Rishon LeZion (IL); Yakov Shay-El Cohen, Rishon Lezion (IL)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 17/500,018

(22) Filed: Oct. 13, 2021

(65) Prior Publication Data

US 2023/0114721 A1     Apr. 13, 2023

(51) Int. Cl.
*H04L 29/06* (2006.01)
*G06F 18/23* (2023.01)
*G06K 9/62* (2022.01)
*H04L 9/40* (2022.01)

(52) U.S. Cl.
CPC .......... *H04L 63/1416* (2013.01); *G06F 18/23* (2023.01); *H04L 63/1425* (2013.01); *H04L 63/145* (2013.01); *H04L 63/20* (2013.01)

(58) Field of Classification Search
CPC ............. H04L 63/1416; H04L 63/1425; H04L 63/145; H04L 63/20; G06F 18/23
See application file for complete search history.

(56) References Cited

U.S. PATENT DOCUMENTS

| | | | |
|---|---|---|---|
| 10,778,702 B1* | 9/2020 | Huang | H04L 63/0236 |
| 10,958,668 B1* | 3/2021 | Wang | G06F 21/554 |
| 2015/0264070 A1* | 9/2015 | Harlacher | H04L 63/1408 726/23 |
| 2016/0065534 A1* | 3/2016 | Liu | G06F 16/951 707/728 |

(Continued)

OTHER PUBLICATIONS

"GitHub—malicialab/avclass: AVClass malware labeling tool", printed on Feb. 5, 2021, 4 pages, <https://github.com/malicialab/avclass>.

(Continued)

*Primary Examiner* — Darshan I Dhruv
(74) *Attorney, Agent, or Firm* — Stephen R. Yoder (57) ABSTRACT

A method for classifying domains to malware families includes identifying a corpus of malicious domains, identifying one or more suspicious domains, extracting a timeframe corresponding to the one or more suspicious domains, calculating a rank coefficient between the one or more suspicious domains and a current seed domain of the corpus of malicious domains, determining whether the rank correlation coefficient exceeds a rank threshold for the one or more suspicious domains, comparing a number of suspicious domains whose correlation coefficients exceed the rank threshold to a relation threshold, and responsive to determining the number of suspicious domains whose correlation coefficients exceed the rank threshold exceeds the relation threshold, applying a tag to the suspicious domains indicating that the one or more suspicious domains correspond to a same malware family as the current seed domain.

20 Claims, 6 Drawing Sheets

(56) References Cited

U.S. PATENT DOCUMENTS

| | | | |
|---|---|---|---|
| 2016/0065597 A1* | 3/2016 | Nguyen | H04L 63/1441 |
| | | | 726/22 |
| 2016/0352772 A1* | 12/2016 | O'Connor | H04L 63/1483 |
| 2016/0366154 A1* | 12/2016 | Denis | H04L 63/145 |
| 2018/0234439 A1 | 8/2018 | Heuser | |
| 2019/0130100 A1* | 5/2019 | Dymshits | G06F 16/90335 |
| 2019/0132344 A1* | 5/2019 | Lem | G06N 20/00 |
| 2020/0334353 A1 | 10/2020 | Kosarev | |
| 2020/0351270 A1 | 11/2020 | Burton | |
| 2021/0304013 A1* | 9/2021 | Zhang | G06N 5/01 |
| 2021/0342447 A1* | 11/2021 | Sanzgiri | H04L 63/1441 |
| 2021/0377303 A1* | 12/2021 | Bui | G06F 40/14 |

OTHER PUBLICATIONS

Choudhary et al., "Algorithmically Generated Domain Detection and Malware Family Classification", Springer Nature Singapore Pte Ltd. 2019, S. M. Thampi et al. (Eds.): SSCC 2018, CCIS 969, pp. 640-655, 2019, 16 pages.

Fukushima et al., "Proactive Blacklisting for Malicious Web Sites by Reputation Evaluation Based on Domain and IP Address Registration", 2011 International Joint Conference of IEEE TrustCom-11/IEEE ICESS-11/FCST-11, 10 pages.

Lazar et al., "IMDoC: Identification of Malicious Domain Campaigns via DNS and Communicating Files", IEEE Access, vol. 9, 2021, Received Feb. 20, 2021, accepted Mar. 7, 2021, date of publication Mar. 18, 2021, date of current version Mar. 29, 2021, 17 pages, Digital Object Identifier 10.1109/ACCESS.2021.3066957, Grace Period Disclosure Document.

\* cited by examiner

DOMAIN MALWARE FAMILY CLASSIFICATION

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:

"IMDoC: Identification of Malicious Domain Campaigns via DNS and Communicating Files", Authors David Lazar, Kobi Cohen, Alon Freund, Avishay Bartik, and Aviv Ron, published Mar. 18, 2021.

BACKGROUND

The present invention relates generally to the field of data storage, and more specifically to classifying of DNS domain names to malware families and types.

Malware classification is the process of assigning a malware sample to a specific malware family. Malware within a family shares similar properties that can be used to create signatures for detection and classification. Signatures can be categorized as static or dynamic based on how they are extracted. A static sequence can be based on a byte-code sequence, binary assembly instruction, or an imported Dynamic Link Library. Dynamic signatures can be based on file system activities, terminal commands, network communications, or function and system call sequences. Similar to the classification of malware, corresponding domains can also be classified according to the malware families which are most likely to utilize them.

SUMMARY

As disclosed herein, a computer implemented method for classifying domains to malware families includes identifying a corpus of malicious domains, identifying one or more suspicious domains, extracting a timeframe corresponding to the one or more suspicious domains, calculating a rank coefficient between the one or more suspicious domains and a current seed domain of the corpus of malicious domains, determining whether the rank correlation coefficient exceeds a rank threshold for the one or more suspicious domains, comparing a number of suspicious domains whose correlation coefficients exceed the rank threshold to a relation threshold, and responsive to determining the number of suspicious domains whose correlation coefficients exceed the rank threshold exceeds the relation threshold, applying a tag to the suspicious domains indicating that the one or more suspicious domains correspond to a same malware family as the current seed domain.

DETAILED DESCRIPTION

Malicious domain identification is a well-known and extensive problem. Once a malicious domain has been identified, determining which malware families and threat groups are related may be important in order to determine appropriate actions. The malware families and threat groups can additionally provide insights to clarify the domain's malicious activity behavior and purpose. As a result, said information may enable Security Operations Center (SOC) analysts to better understand cyber security threats and handle said threats more efficiently. A relation of a domain to a specific malicious activity may enable security researchers to build better models based on this data in order to mitigate security issues. Moreover, it can help analysts and researchers to gain better insights on the behavior of an observed threat group.

Figure 5:
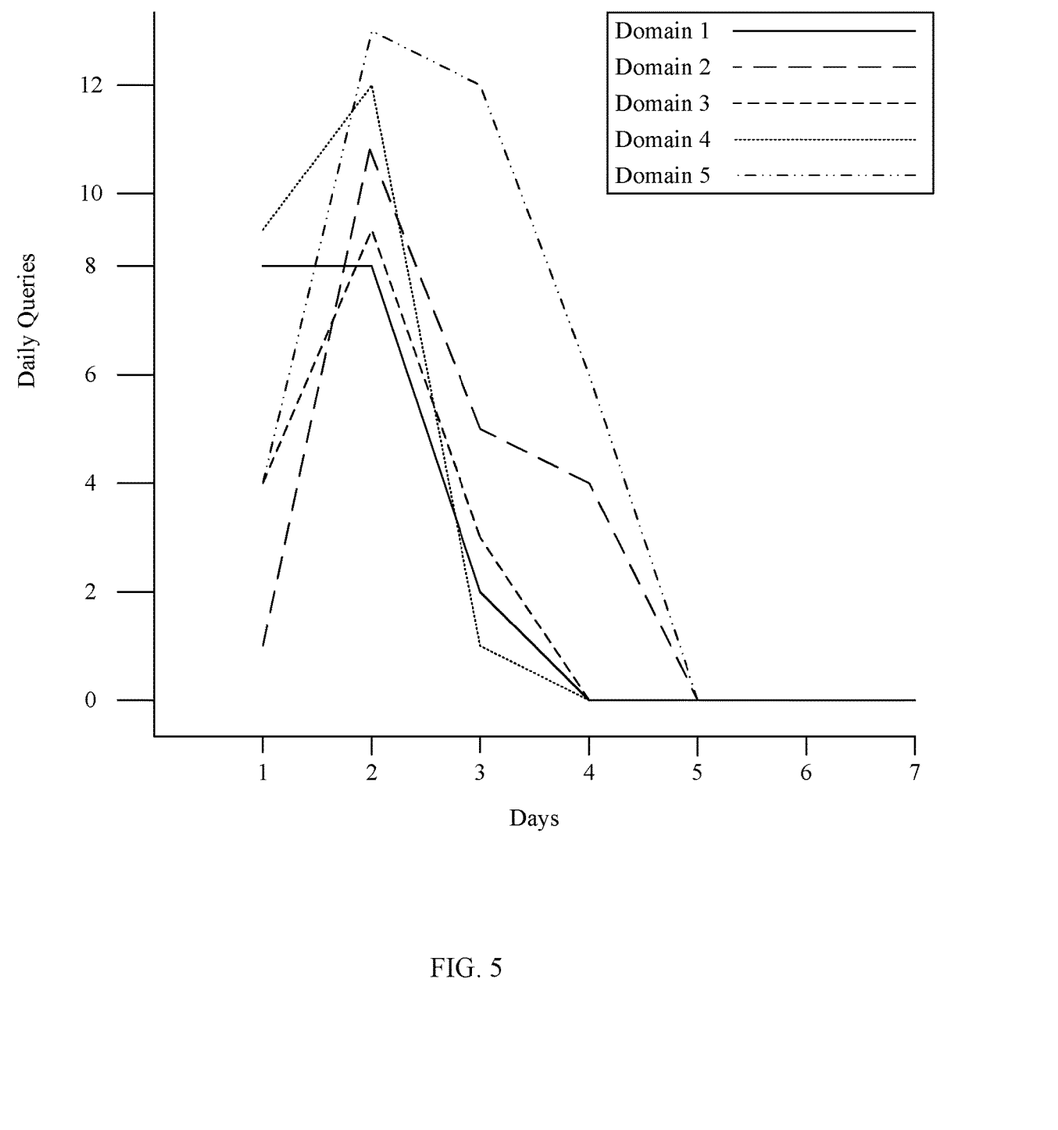
FIG. 5 depicts an example domain query frequency diagram in accordance with an embodiment of the present invention.

Two methods are described for building a classifier that, given a domain name, can classify which malware family said domain belongs to. The first method includes obtaining data for a set of domains, constructing feature vectors corresponding to said domains, clustering the feature vectors, expanding the domains, and predicting a malware classification for the domains according to the clusters. The first method carries said process out largely according to two data items: a time/date of a last IP change observed for the given domain, wherein an IP change means a new IP address has been resolved to the domain by an authoritative DNS server, and an amount of DNS requests performed to the given domain, for a predefined time period since the last observed IP change. The above data can be attained with passive DNS inspection or server logs, or from threat intelligence providers. For example, a DNS provider might collect logs on the IP changes of the domains it resolves, and the number of queries clients are performing to it. Consider FIG. 5, which displays one example of a frequency diagram corresponding to malware families and domains. The first method may additionally require a corpus of malicious domain names and their data items for a specific malware family in order to relate a new domain to this family.

The second method is trained on a corpus of malicious domain names. The corpus may include a mapping to file hashes that have communicated with these domains, and that are tagged according to malware family. If the data is unavailable, the method can construct this corpus from data from threat intelligence providers. The method then constructs a histogram of malware families for each domain. Based on the constructed histograms, the method then clusters the corpus domains and computes the cluster center for each cluster. Given a suspicious domain and associated files or file hashes, a distance for the given domain is calculated from the cluster center, and if a configurable threshold is passed, the nearest average histogram represents the malware family of this domain.

The present invention will now be described in detail with reference to the Figures. Implementation of embodiments of the invention may take a variety of forms, and exemplary implementation details are discussed subsequently with reference to the Figures.

Figure 1:
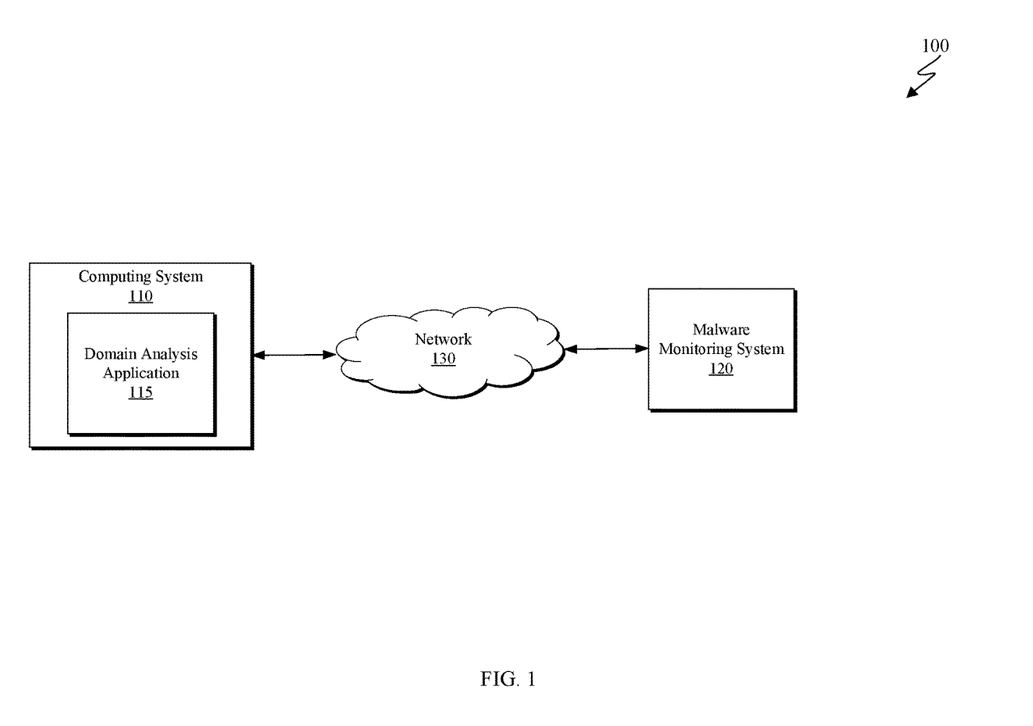
FIG. 1 is a block diagram depicting a domain classification system in accordance with at least one embodiment of the present invention.

FIG. 1 is a block diagram depicting a domain classification system 100 in accordance with at least one embodiment of the present invention. As depicted, domain classification system 100 includes computing system 110, malware monitoring system 120, and network 130. Domain classification system 100 may enable improved domain classification with respect to corresponding malware families.

Computing system 110 can be a desktop computer, a laptop computer, a specialized computer server, or any other computer system known in the art. In some embodiments, computing system 110 represents computer systems utilizing clustered computers to act as a single pool of seamless resources. In general, computing system 110 is representative of any electronic device, or combination of electronic devices, capable of receiving and transmitting data, as described in greater detail with regard to FIG. 6. Computing system 110 may include internal and external hardware components, as depicted and described in further detail with respect to FIG. 6.

As depicted, computer system 110 includes domain analysis application 115. Domain analysis application 115 may be configured to execute any of the malware analysis or classification methods or associated sub methods as described with respect to FIG. 2, FIG. 3, and FIG. 4. In other words, domain analysis application 115 is configured to receive data corresponding to one or more suspicious domains. Domain analysis application 115 may analyze the received data to provide a classification for the one or more suspicious domains.

Malware monitoring system 120 may be any combination of resources configured to analyze domain activity and detect suspicious or malicious activities with respect to a domain. In at least one embodiment, malware monitoring system 120 includes an anti-virus engine configured to flag and prevent activities consistent with various malware and malware activities. Generally, malware monitoring system 120 may refer to any application or combination of applications capable of providing malware data or activity to domain classification application 115.

Network 130 can be, for example, a local area network (LAN), a wide area network (WAN) such as the Internet, or a combination of the two, and include wired, wireless, or fiber optics connections. In general, network 130 can be any combination of connections and protocols that will support communications between computing system 110, malware monitoring application 120 and network 130.

Figure 2:
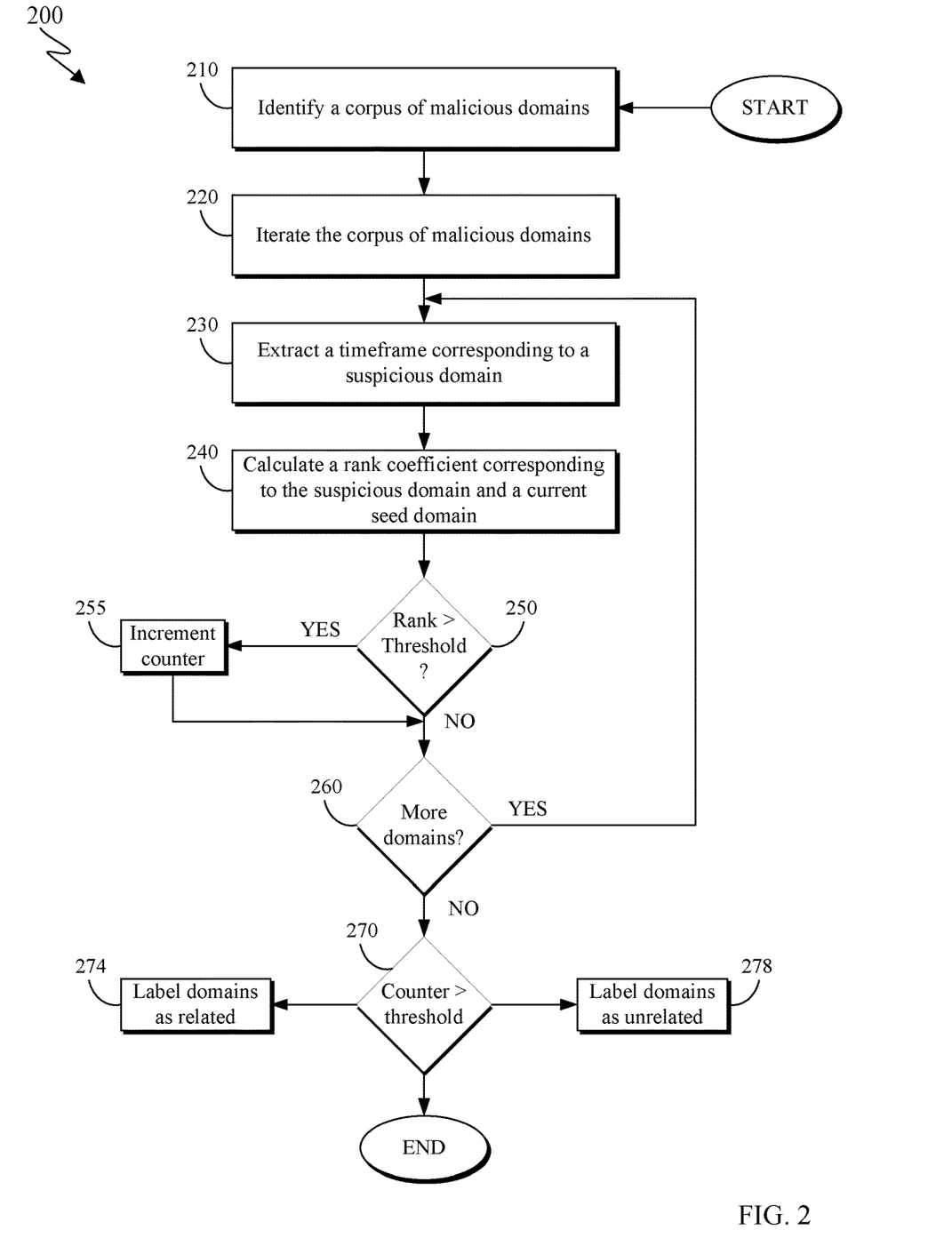
FIG. 2 is a flowchart depicting a malware correspondence method in accordance with at least one embodiment of the present invention.

FIG. 2 is a flowchart depicting a malware correspondence method 200 in accordance with at least one embodiment of the present invention. As depicted, the malware correspondence method 200 includes identifying (210) a corpus of malicious domains, iterating (220) the corpus of domains, extracting (230) a timeframe corresponding to a suspicious domain, calculating (240) a rank coefficient between the selected domain and a seeded domain, determining (250) whether the determined rank exceeds a rank threshold, incrementing (255) a counter, determining (260) whether additional domains are present, determining (270) whether the counter exceeds a relation threshold, labeling (274) the domains as related, and labeling (278) the domains as unrelated. Malware correspondence method 200 may enable domains to be associated with malware families to which they belong.

Identifying (210) a corpus of malicious domains may include training a system to recognize a plurality of domains belonging to a same malware family. In at least some embodiments, identifying (210) a corpus of malicious domains includes identifying one or more domains which are susceptible to a shared malicious activity. Identifying (210) a corpus of malicious domains may include enabling a security analyst to collect evidences from available sources to inform the system of various domains belonging to a same malware family. In some embodiments, identifying (210) a corpus of malicious domains includes leveraging existing threat intelligence providers to classify domains according to their malware family, and subsequently identify a plurality of domains corresponding to a malware family of interest.

Iterating (220) the corpus of domains may include iterating the following steps with respect to each domain of interest. In other words, steps 230-278 may be executed with respect to each domain of the corpus of domains as appropriate.

Extracting (230) a timeframe corresponding to a suspicious domain may include identifying a time at which an IP change occurred corresponding to said suspicious domain. In at least some embodiments, suspicious domains (denoted as "S") are domains that are known to be malicious according to prior analysis or an additional data source. Similarly, other domains to be analyzed that may not have been identified as suspicious at current are denoted as "E". In at least some embodiments, extracting (230) a timeframe corresponding to a suspicious domain includes determining an amount of time that has elapsed since a most recent IP change occurred. The elapsed time since a most recent IP change may be referred to as TP. In at least some embodiments, TP is measured in days, though in various embodiments any unit of measurement appropriate for measuring time may be suitable. The identified timeframe may be referred to herein as $t_c$. In at least some embodiments, extracting (230) a timeframe corresponding to a suspicious domain additionally includes identifying a number of queries observed for the suspicious domain for each day within the timeframe. In embodiments where an alternative measurement for time is preferable, the number of queries observed may be considered hourly rather than daily, etc. In at least some embodiments, extracting (230) a timeframe may be extended to additionally extract time frames for the seed domains according to the methodology described above. In at least some embodiments, extracting the seed domains timeframe may occur prior to the suspicious domain timeframe extraction.

Calculating (240) a rank coefficient between the selected domain and a current seed domain may include determining a strength of a monotonic relationship between the selected domain and the current seed domain. In some embodiments, calculating (240) a rank coefficient includes determining a Spearman's rank correlation coefficient. Spearman's rank correlation coefficient is a nonparametric measure of rank correlation that measures monotonic relationships between two variables. Spearman's rank correlation coefficient has a value in the range [−1,1] where a correlation value of 1 is achieved when the two observed variables have a similar rank, and a correlation value of −1 is achieved when the two observed variables have a dissimilar rank. Let X and Y be two variables, such as the current seed domain and the selected domain, wherein each of the two variables has n observations. The Spearman's rank correlation coefficient is then defined as:

$$r_s = \frac{1 - 6\sum_{i=1}^{n} d_i^2}{n(n^2 - 1)}$$

wherein $d_i = \text{rg}(X_i) - \text{rg}(Y_i)$ and $\text{rg}(\cdot)$ is the rank of the observation.

Determining (250) whether the determined rank correlation coefficient exceeds a rank threshold may include comparing the determined rank correlation coefficient to a selected rank threshold. In some embodiments, the selected rank threshold may be a value pre-selected by a user. The selected rank threshold may be a value indicative of a point at which the two compared variables, in this case the selected domain and the current seed domain, are considered to be effectively similar. If the determined rank correlation coefficient exceeds the rank threshold (250, yes branch), the method continues by incrementing (255) a counter. If the determined rank correlation coefficient does not exceed the rank threshold (250, no branch), the method continues by determining (260) whether additional domains remain in the corpus.

Incrementing (255) a counter may include using a + operator to add 1 to an amount retained by a counter. In at least some embodiments, the counter is configured to track the number of times a rank correlation coefficient for a domain exceeds the rank threshold. In general, incrementing (255) a counter may include carrying out any number of arithmetic expansion operations to augment or update a counter to reflect a current count of domains for which a rank correlation coefficient has exceeded the selected rank threshold.

Determining (260) whether additional domains are present may include determining whether any additional domains remain to be analyzed or compared. If additional domains are present (260, yes branch), the method continues by returning to extracting (230 a timeframe corresponding to a suspicious domain. If additional domains are not present (260, no branch), the method continues by determining (270) whether the counter exceeds a relation threshold.

Determining (270) whether the counter exceeds a relation threshold may include comparing the value currently held by the counter to a selected relation threshold. In at least some embodiments, the selected relation threshold is selected such that any number in the counter exceeding said threshold would indicate a relationship between the selected domain and the malware family. If the counter exceeds a relation threshold (270, yes branch), the method continues by labeling (274) the domains as related. If the counter does not exceed a relation threshold (270, no branch), the method continues by labeling (278) the domains as unrelated.

Labeling (274) the domains as related may include identifying a malware family to which the seeded domain belongs. In at least some embodiments, labeling (274) the domains includes applying a tag to the analyzed domain indicating that the domain corresponds to the malware family of the seeded domain. Labeling (274) the domains as related may additionally include applying a tag indicating that the analyzed domain and the current seeded domain correspond to a same malware family; in other words, the applied tags may indicate a malware family, additional domains sharing the same malware family, or any combination of the two.

Labeling (278) the domains as unrelated may include applying a tag to the analyzed domain indicating that the domain does not correspond to the same malware family as the current seeded domain. In some embodiments, labeling (278) the domains as unrelated simply comprises applying no tag to the analyzed domain, as a corresponding malware family has not been identified.

Figure 3:
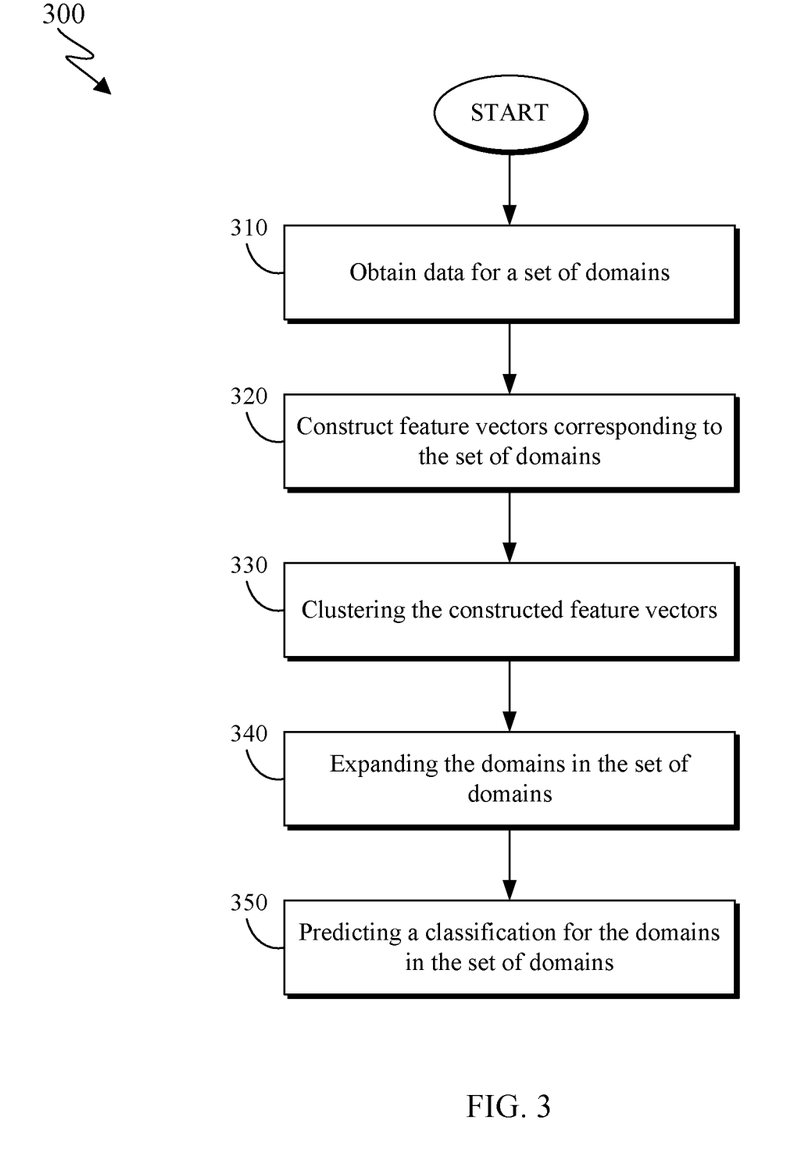
FIG. 3 is a flowchart depicting a domain analysis method in accordance with at least one embodiment of the present invention.

FIG. 3 is a flowchart depicting a domain analysis method 300 in accordance with at least one embodiment of the present invention. As depicted, the domain analysis method 300 includes obtaining (310) data for a set of domains, constructing (320) one or more feature vectors corresponding to the set of domains, clustering (330) the feature vectors, expanding (340) the domains from the set of domains, and predicting (350) a classification for the domains from the set of domains. Domain analysis method 300 may enable increased accuracy when predicting a malware family to which a domain corresponds.

Obtaining (310) data for a set of domains may include identifying a feed of malicious domains, $N_d$. In at least some embodiments, the set of domains have exhibited some indication of malicious activity. Obtaining (310) data for a set of domains may additionally include leveraging a heuristic automated method to identify malicious activity within the domains. In other embodiments, a security analyst may manually identify indications of malicious activity.

Constructing (320) one or more feature vectors corresponding to the set of domains may include obtaining a corpus of files that have communicated with the set of domains. A file is considered to have communicated with a domain by static analysis of said file or dynamic analysis of the file such as execution in a sandbox. In at least some embodiments, every domain that has either been queried in dynamic analysis or mentioned in source code is considered a domain that a file has communicated with. Said domains could be utilized as command and control domains of a malware. In at least some embodiments, constructing (320) one or more feature vectors corresponding to the set of domains includes using a threat intelligence provider or analyzing threat feeds and reports. In at least some embodiments, constructing (320) one or more feature vectors provides a set of feature vectors for all the malicious domains V. Constructing (320) one or more feature vectors may additionally include incrementing occurrences of an observed file in the malware family, $1_j$, in the current observed domain's feature vector, $V_{dj}$. In at least some embodiments, constructing (320) one or more feature vectors includes normalizing the results per domain. Consider FIG. 4, which displays one example of a feature vector construction method.

Clustering (330) the feature vectors may include locating domains with similar histograms of communicating file malware families in shared clusters. In at least some embodiments, clustering (330) the feature vectors includes leveraging clustering methods such as K-Means or DBCAN. Clustering (330) the feature vectors in this manner provides a group of clusters X wherein the domains within a cluster share a same malware family communicating files histogram. Once the clusters are populated, the domains within said clusters are considered seed domains for the corresponding malware campaign.

Expanding (340) the domains from the set of domains may include identifying a corpus of domain names and corresponding resolved IP addresses. In at least some embodiments, expanding (340) the domains includes using threat intelligence providers, open threat feeds, or passive DNS inspection to obtain a corpus of domain names. Once the corpus of domain names is obtained, expanding (340) the domains further includes iterating over the domains in the obtained clusters, and extracting all resolved IPs for each domain $d_j$ under the examined time period. The set of IPs resolved to domain $d_j$ may be referred to as $IP_{dj}$. At this point, any domain resolved to these IPs will be considered an expanded domain.

Predicting (350) a classification for the domains from the set of domains may include identifying cluster centers corresponding to the clustered feature vectors. Once the cluster centers are identified, predicting (350) a classification for the domains from the set of domains may additionally include calculating the distance between the domain's feature vector and the cluster centers. The domain may then be associated with the nearest cluster, i.e. the cluster for which the distance to the cluster center is the lowest. In at least some embodiments, a configurable threshold for distance to cluster center is utilized, in which case if there are no clusters for which the distance is less than the threshold, the domain will not be associated with any malware family. In some embodiments, predicting (350) a classification for the domains from the set of domains includes training a one class classifier corresponding to each cluster, and subsequently creating an ensemble method to choose which of the clusters best fits the domain. Predicting (350) a classification for the domains provides a label or tag for each predicted domain, and based on these prediction labels, one can classify the domain into a malware family or campaign accordingly.

Figure 4:
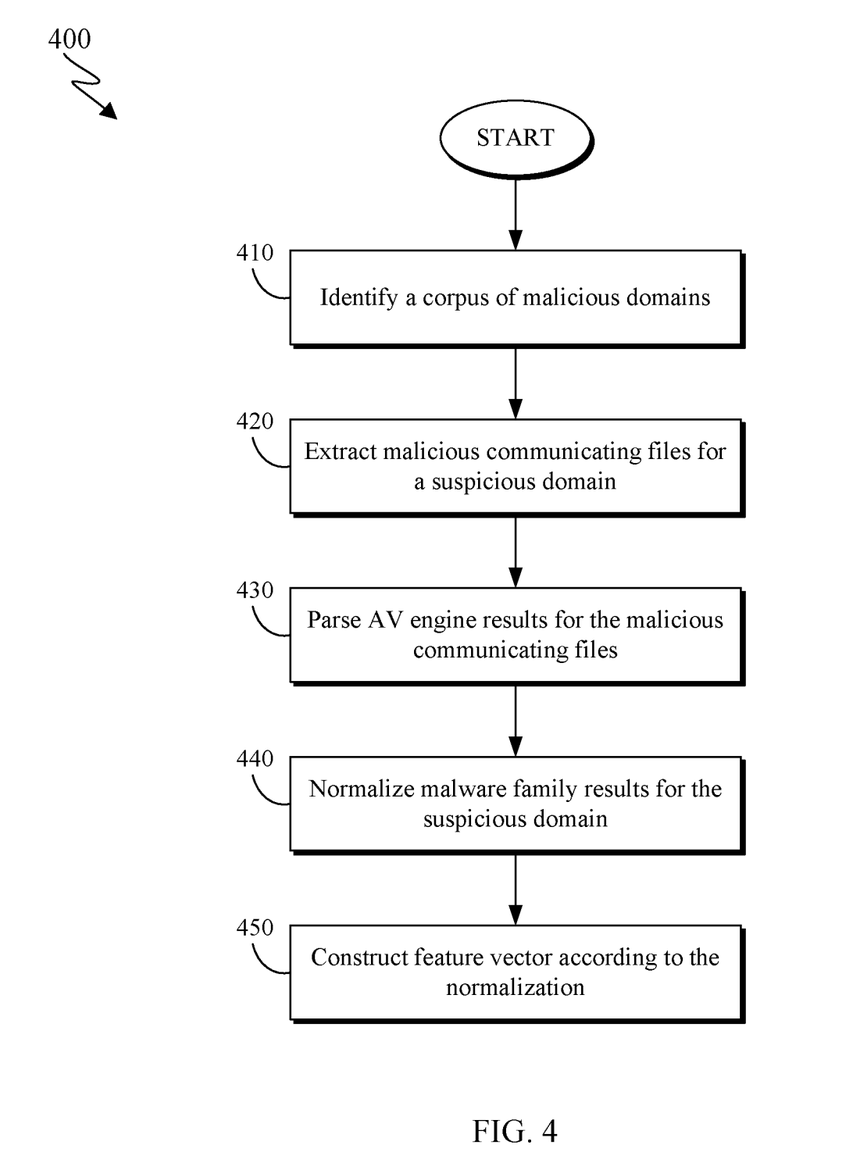
FIG. 4 is a flowchart depicting one example of a feature vector construction method in accordance with at least one embodiment of the present invention.

FIG. 4 is a flowchart depicting one example of a feature vector construction method 400 in accordance with at least one embodiment of the present invention. As depicted, feature vector construction method 400 includes identifying (410) a corpus of malicious domains, extracting (420) malicious communicating files for a domain, parsing (430) AV engines results for the malicious communicating files, normalizing (440) malware family results for the domain, and constructing (450) the feature vector according to the normalization.

Identifying (410) a corpus of malicious domains may include identifying a feed of malicious domains, $N_d$. In at least some embodiments, the set of domains have exhibited some indication of malicious activity. Identifying (410) a corpus of malicious domains may additionally include leveraging a heuristic automated method to identify malicious activity within the domains. In other embodiments, a security analyst may manually identify indications of malicious activity. In yet other embodiments, identifying (410) a corpus of malicious domains may simply correspond to acquiring or obtaining a corpus of malicious domains from a system or application which has already identified said domains as malicious.

Extracting (420) malicious communicating files for a domain may include using a threat intelligence provider to identify files which communicate with the domain. In at least some embodiments, extracting (420) malicious communicating files for a domain may include analyzing identified communicating files by static analysis of said files. Analyzing the communicating files may additionally include using dynamic analysis techniques, such as execution in a sandbox.

Parsing (430) Anti-Virus (AV) engines results for the malicious communicating files may include querying one or more anti-virus engines with respect to the extracted malicious communicating files. In some embodiments, parsing (430) AV engine results for the malicious communicating files includes querying one or more selected AV engines for query results, wherein the selected AV engines correspond to AV engines that have been identified as preferred or trusted by a user or admin.

Normalizing (440) malware family results for the domain may include calculating a frequency corresponding to the malicious communicating files according to the malware family results and the AV engine results. In at least some embodiments, normalizing (440) malware family results includes identifying how frequently the malicious communicating files appear. In yet other embodiments, normalizing (440) malware family results includes determining how prolific the malicious communicating files are relative to all communicating files within the domain.

Constructing (450) the feature vector according to the normalization may include calculating a vector based on the normalization malware family results. Constructing (450) the feature vector may include obtaining a corpus of files that have communicated with the subject set of domains. A file is considered to have communicated with a domain by static analysis of said file or dynamic analysis of the file such as execution in a sandbox. In at least some embodiments, every domain that has either been queried in dynamic analysis or mentioned in source code is considered a domain that a file has communicated with. Said domains could be utilized as command and control domains of a malware. In at least some embodiments, constructing (450) the feature vector includes using a threat intelligence provider or analyzing threat feeds and reports. In at least some embodiments, constructing (450) the vector provides a feature vector for malicious domains V. Constructing (450) a feature vector may additionally include incrementing occurrences of an observed file in the malware family, $1_j$, in the current observed domain's feature vector, $V_{dj}$. It should be noted with respect to $1_j$ and $V_{dj}$ that the index $j$ does not necessarily need to be the same.

Figure 6:
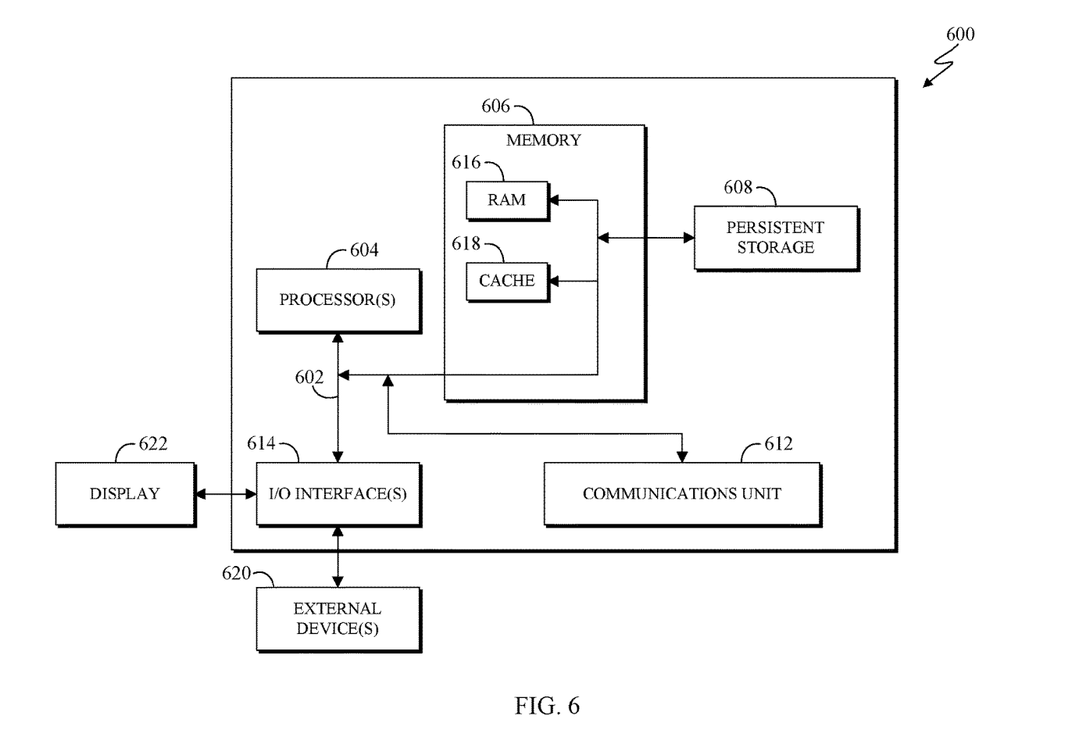
FIG. 6 is a block diagram of components of a computing system in accordance with an embodiment of the present invention.

FIG. 6 depicts a block diagram of components of computing system 110 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for classifying domains to malware families, the method comprising:
    identifying a corpus of malicious domains;
    identifying one or more suspicious domains;
    extracting a timeframe corresponding to the one or more suspicious domains;
    calculating a rank correlation coefficient between the one or more suspicious domains and a current seed domain of the corpus of malicious domains;
    determining whether the rank correlation coefficient exceeds a rank threshold for the one or more suspicious domains to provide a similarity count indicating a number of suspicious domains of the one or more suspicious domains whose rank correlation coefficients exceed the rank threshold;
    comparing the similarity count to a relation threshold; and
    responsive to determining the similarity count exceeds the relation threshold, applying a tag to the one or more suspicious domains indicating that the one or more suspicious domains correspond to a same malware family as the current seed domain.

2. The computer implemented method of claim 1, further comprising incrementing a counter corresponding to a number of times the rank correlation coefficient for a domain exceeds a rank threshold.

3. The computer implemented method of claim 2, wherein comparing a number of suspicious domains whose rank correlation coefficient exceeds the rank threshold to a relation threshold includes comparing a current count corresponding to the counter to the relation threshold.

4. The computer implemented method of claim 1, further comprising constructing one or more feature vectors corresponding to the one or more suspicious domains.

5. The computer implemented method of claim 4, further comprising clustering the feature vectors.

6. The computer implemented method of claim 5, further comprising determining a distance from a suspicious domain's feature vector to one or more cluster centers corresponding to the clustered feature vectors.

7. The computer implemented method of claim 6, further comprising determining a cluster center to which the one or more feature vectors are closest.

8. A computer program product for classifying domains to malware families, the computer program product comprising:
    one or more computer readable storage media and program instructions stored on the one or more computer readable storage media, the program instructions comprising instructions to:
    identify a corpus of malicious domains;
    identify one or more suspicious domains;
    extract a timeframe corresponding to the one or more suspicious domains;
    calculate a rank correlation coefficient between the one or more suspicious domains and a current seed domain of the corpus of malicious domains;
    determine whether the rank correlation coefficient exceeds a rank threshold for the one or more suspicious domains to provide a similarity count indicating a number of suspicious domains of the one or more suspicious domains whose rank correlation coefficients exceed the rank threshold;
    compare the similarity count to a relation threshold; and
    responsive to determining the similarity count exceeds the relation threshold, apply a tag to the one or more suspicious domains indicating that the one or more suspicious domains correspond to a same malware family as the current seed domain.

9. The computer program product of claim 8, further comprising instructions to increment a counter corresponding to a number of times the rank correlation coefficient for a domain exceeds a rank threshold.

10. The computer program product of claim 9, wherein comparing a number of suspicious domains whose rank correlation coefficient exceeds the rank threshold to a relation threshold includes comparing a current count corresponding to the counter to the relation threshold.

11. The computer program product of claim 8, further comprising instructions to construct one or more feature vectors corresponding to the one or more suspicious domains.

12. The computer program product of claim 11, further comprising instructions to cluster the one or more feature vectors.

13. The computer program product of claim 12, further comprising instructions to determine a distance from a suspicious domain's feature vector to one or more cluster centers corresponding to the clustered feature vectors.

14. The computer program product of claim 13, further comprising instructions to determine a cluster center to which the one or more feature vectors are closest.

15. A computer system for, the computer system comprising:
- one or more computer processors;
- one or more computer-readable storage media;
- program instructions stored on the computer-readable storage media for execution by at least one of the one or more processors, the program instructions comprising instructions to:
- identify a corpus of malicious domains;
- identify one or more suspicious domains;
- extract a timeframe corresponding to the one or more suspicious domains;
- calculate a rank correlation coefficient between the one or more suspicious domains and a current seed domain of the corpus of malicious domains;
- determine whether the rank correlation coefficient exceeds a rank threshold for the one or more suspicious domains to provide a similarity count indicating a number of suspicious domains of the one or more suspicious domains whose rank correlation coefficients exceed the rank threshold;
- compare the similarity count to a relation threshold; and
- responsive to determining the similarity count exceeds the relation threshold, apply a tag to the one or more suspicious domains indicating that the one or more suspicious domains correspond to a same malware family as the current seed domain.

16. The computer system of claim 15, further comprising instructions to increment a counter corresponding to a number of times the rank correlation coefficient for a domain exceeds a rank threshold.

17. The computer system of claim 15, further comprising instructions to construct one or more feature vectors corresponding to the one or more suspicious domains.

18. The computer system of claim 17, further comprising instructions to cluster the one or more feature vectors.

19. The computer system of claim 18, further comprising instructions to determine a distance from a suspicious domain's feature vector to one or more cluster centers corresponding to the clustered feature vectors.

20. The computer system of claim 19, further comprising instructions to determine a cluster center to which the one or more feature vectors are closest.

\* \* \* \* \*